May 27, 1969 S. R. GARNER 3,446,519
TRAILER HITCH
Filed April 17, 1967 Sheet 3 of 3
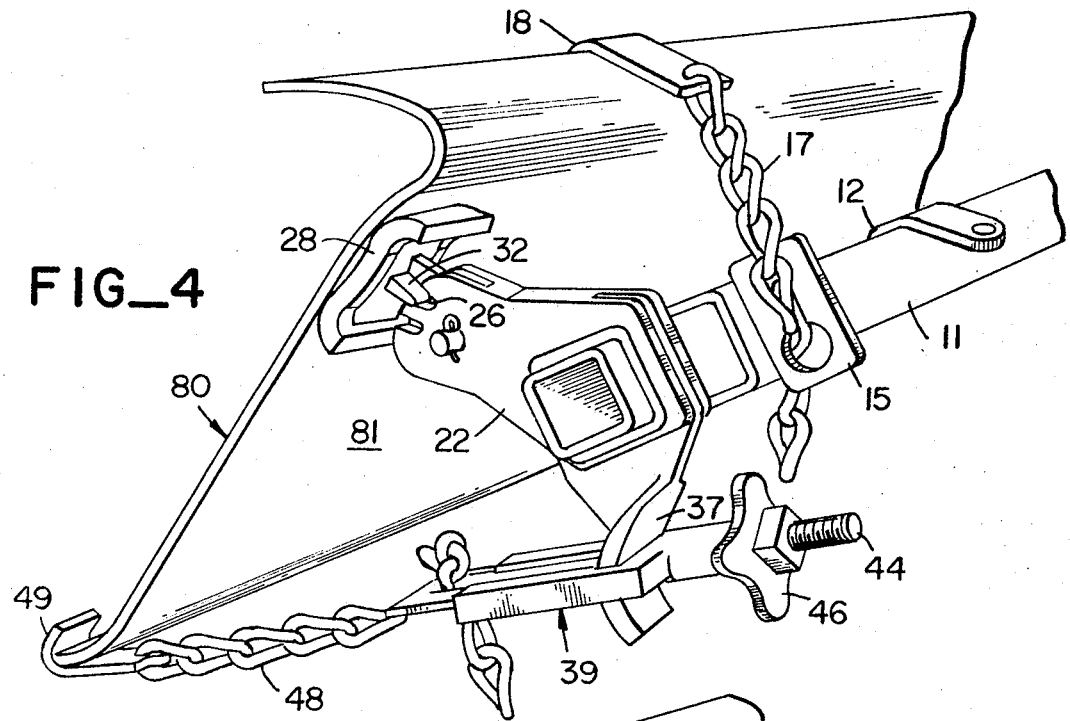
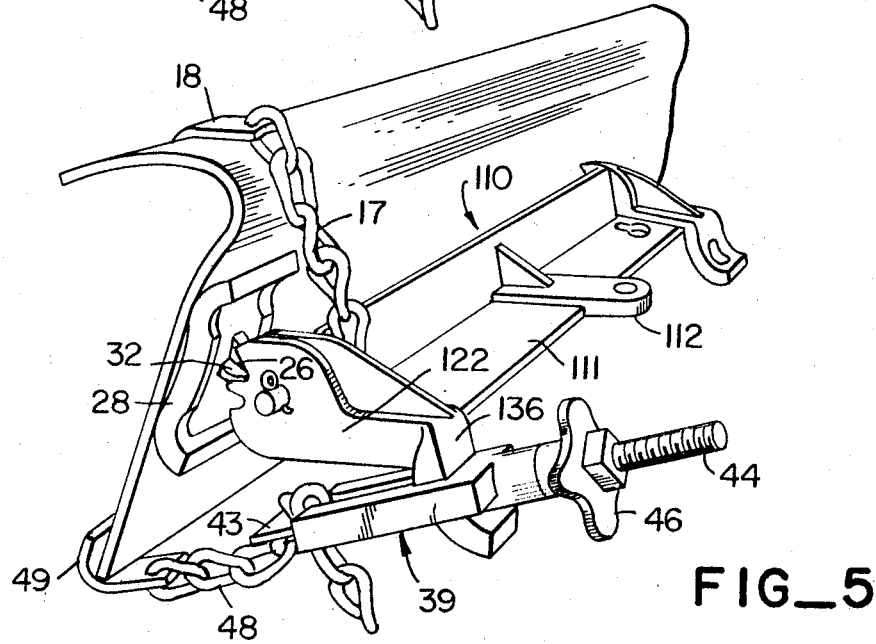
INVENTOR.
STANLEY R. GARNER
BY
Mellin, Moore + Weissenberger
ATTORNEYS United States Patent Office 3,446,519
Patented May 27, 1969

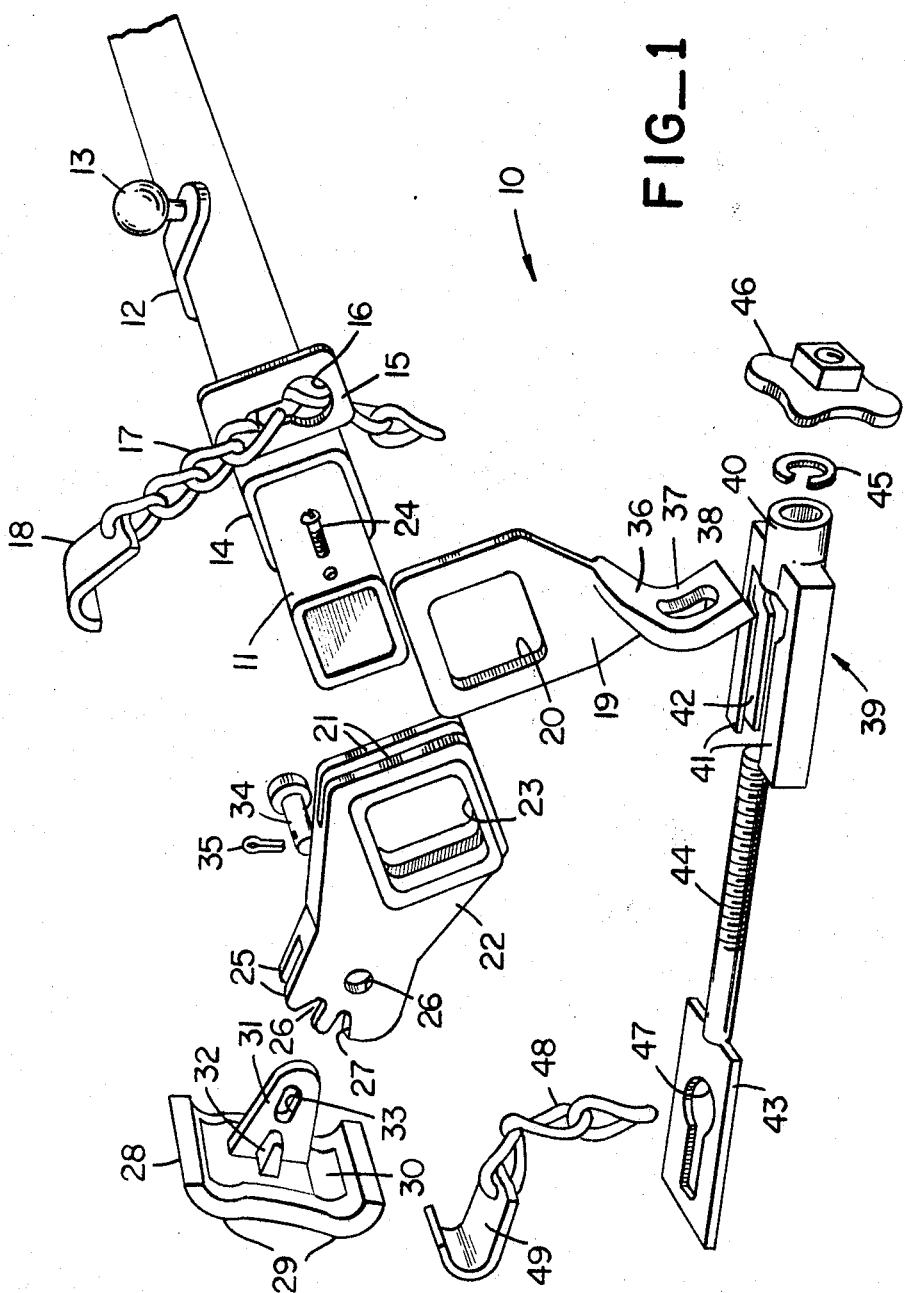

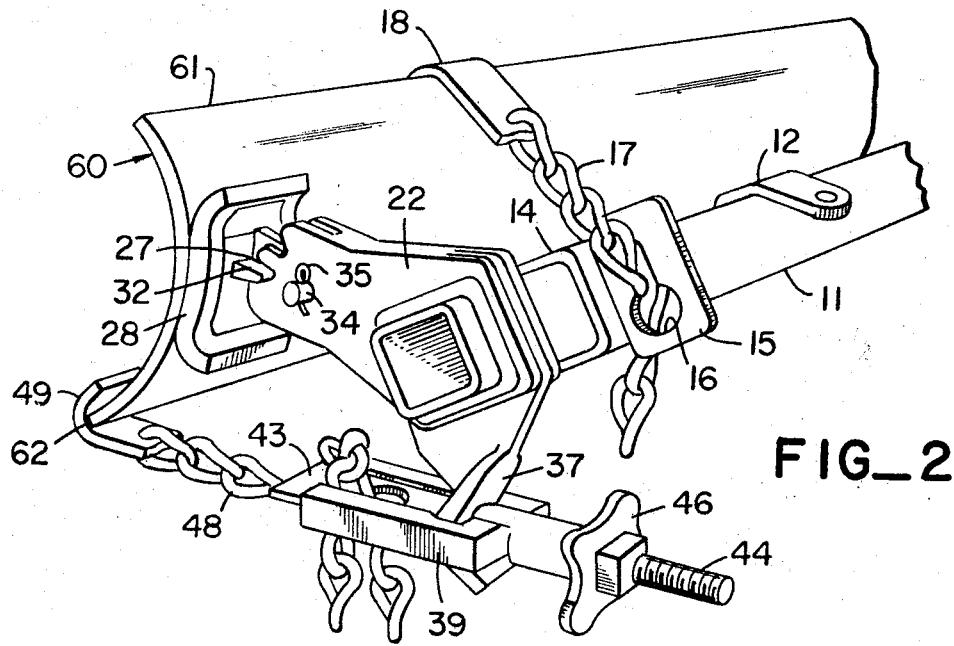
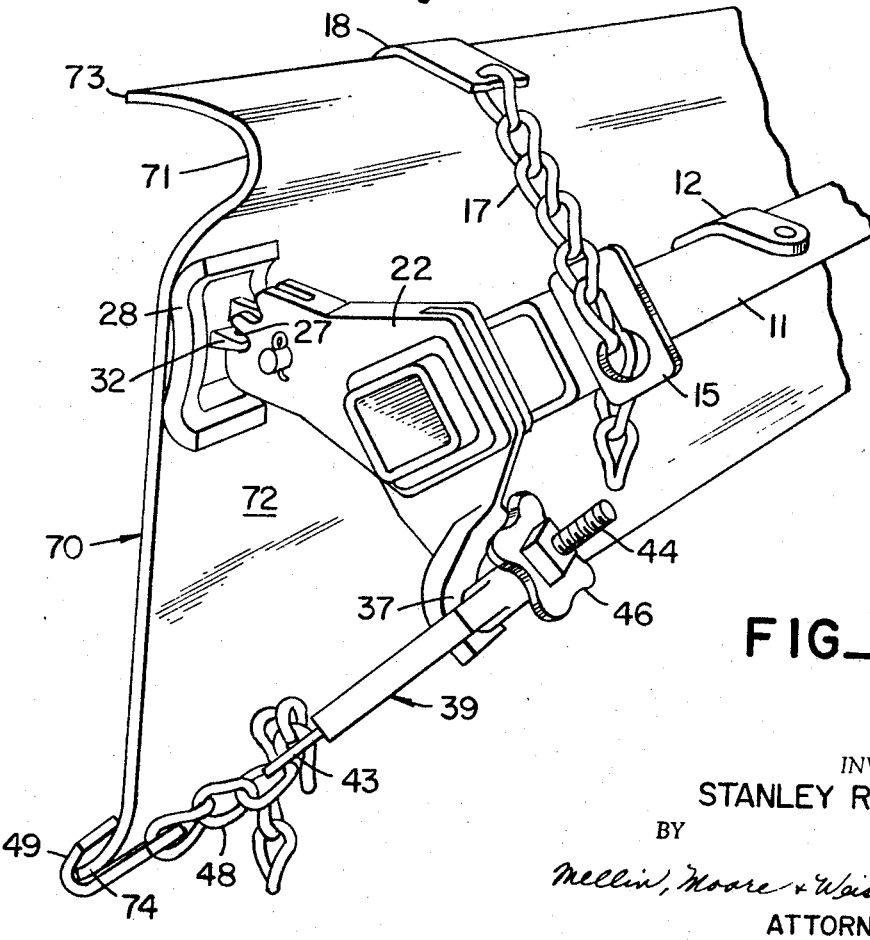

3,446,519
TRAILER HITCH
Stanley R. Garner, Los Angeles, Calif., assignor to Valley
Tow-Rite, Inc., Lodi, Calif., a corporation of California
Filed Apr. 17, 1967, Ser. No. 631,333
Int. Cl. B60d
U.S. Cl. 280—502     3 Claims

ABSTRACT OF THE DISCLOSURE

A trailer hitch for attachment to a vehicle bumper, which hitch has chained hooks to engage the upper and lower edge of the bumper and a pad to engage the middle of the bumper and in which the pad is tiltable to engage vertical or slanting bumpers and the lower chain tightener is tiltable so that a straight pull is placed on the lower chain whether the bumper be narrow or wide.

Background of the invention

This invention relates to trailer hitches and has for its main object the provision of a bumper hitch which will fit all standard bumpers.

At present there are many trailer rental agencies throughout the country which rent trailers on a short-term basis to vehicle owners. Very few of these vehicle owners have trailer hitches already mounted on their vehicles, so the rental agency must attach a trailer hitch to the vehicle so that the trailer may in turn be hitched thereto.

The typical trailer hitch now in use consists of an elongated bar which extends parallel to the bumper and which has a ball member of a ball hitch carried thereby. The bar is attached at each end thereof to the bumper by hooks secured to the bar and which engage the upper and lower edges of the bumper, and by a pad which extends from the bar to engage the bumper. The hitch must be mounted so that the bracket to which the ball member is mounted is generally horizontal.

It is a relatively simple matter to design such a trailer hitch for any specific shape bumper. However, there is little uniformity in bumper designs of the various cars and trucks now being produced, and such bumpers come in varying widths and cross-sectional configurations. Some are narrow, some wide. Some are curved, some flat. Some are generally vertical, some slant forwardly, some slant rearwardly. In order to be able to fit any vehicle that may be driven in, the trailer rental agency must stock a number of different trailer hitches, which naturally adds to his cost of doing business.

Summary of the invention

The present invention has been made to provide a trailer hitch which may be easily installed on all presently encountered vehicle bumpers, which will maintain the ball bracket in horizontal position, and which will have the same tightening force applied to the components in spite of variations in width and slope of the bumpers.

In general, the objects of the invention are accomplished by providing a tilting connection between the body of the hitch and the bumper pad so that the pad can accommodate itself to vertical or slanting bumpers without tilting the ball bracket. The hitch is also provided with means to lock the pad in its tilted position.

The hitch is also arranged so that the chain which connects the lower hook to the body of the hitch is tightened by applying a force thereto that is in alignment with the chain, regardless of the width of the bumper. This is accomplished by using a tilting connection between the chain-tightening means and the body of the hitch. Accordingly, no bending forces are applied to the chain-tightening means and the forces applied to the hitch elements are the same for all installations.

Other objects and advantages will become apparent in the course of the following detailed description.

Brief description of the drawings

In the drawings, forming a part of this application, and in which like parts are designated by like reference numerals throughout the same, FIG. 1 is an exploded perspective view of one end and the middle portion of a trailer hitch constructed in accordance with the present invention.

FIGS. 2, 3 and 4 are perspective views of the trailer hitch of FIG. 1, showing the mannner in which it may be attached to differently configured vehicle bumpers.

FIG. 5 is a perspective view of a modified form of a trailer hitch also incorporating the principles of the present invention.

Referring now to the drawings, and in particular to FIG. 1, the trailer hitch, indicated generally by reference numeral 10, includes an elongated, square, tubular bar 11 having a ball bracket 12 welded thereto at its center, to which a standard ball 13 of a trailer coupling may be secured.

A square collar 14 surrounds the bar 11 and is longitudinally movable thereon, the collar 14 having a chain lock bracket 15 welded thereto. The bracket 15 is provided with a keyhole-shaped opening 16 through which chain 17 extends. The largest portion of opening 16 permits the links of the chain to move therethrough, and when the chain is a desired length, a link is moved into the narrow portion of the opening to lock the chain against further movement through the bracket 15. A hook 18 is attached to the end of chain 17, the hook being designed to be secured to the top edge of a vehicle bumper.

A chain-tightener bracket 19, provided with a square hole 20 at one end thereof, is insertable between the bifurcated legs 21 of pad bracket 22, which legs also have square holes 23 therethrough, and the brackets are mounted on bar 11 with the bar extending through the square holes 20 and 23. The brackets 19 and 22 can be moved together to any desired position along bar 11, but will not rotate relative thereto. To prevent the brackets from accidental removal from bar 11, a stop screw 24 is threaded through the end of bar 11.

The other end of pad bracket 22 is provided with vertically bifurcated arms 25 having horizontal openings 26 therethrough. The outer ends of arms 25 are horizontally notched at 26 and 27.

A rubber bumper pad 28, having two vertically spaced horizontal ridges 29 adapted to engage the vehicle bumper, is carried by pad shoe 30 which is provided with a vertical flange 31 receivable between the bifurcated arms 25 of pad bracket 22 and with a lug 32 receivable into a desired one of the notches 26 or 27 of the pad bracket. The pad shoe flange 31 is provided with elongated opening 33 therethrough, and the pad shoe is secured to the pad bracket 22 by bolt 34, which extends through the pad bracket holes 26 and pad shoe opening 33. The bolt 34 is held in assembled position by cotter pin 35.

By the above construction, the pad 28 may be pulled away from the pad bracket 22, to the extent permitted by the elongated slot 33 through which bolt extends, at which time the pad shoe lug 32 will be moved from the notches 26 and 27, so that the pad can be tilted relative to the pad bracket about an axis parallel to bar 11. The pad may then be moved back towards the pad bracket so that lug 32 seats in one or the other of the notches 26 or 27 to lock the pad in its tilted position.

The chain-tightener bracket 19 has a downwardly depending arm 36 having a concavely curved seat 37 thereon parallel to bar 11, the arm being provided with an elongated aperture 38 through the seat 37. A saddle member 39 is seated in seat 37 for rotative movement about an axis parallel to bar 11, the saddle member having a hollow collar portion 40 in alignment with aperture 38. Legs 41 of saddle member 39 straddle seat 37 and are provided with grooves 42 on the inner surfaces thereof.

A chain lock plate 43 is slidably received in saddle member grooves 42, and threaded bolt 44 secured to chain lock plate 43 extends through seat aperture 38 and saddle member collar 40. A lock washer 45 surrounds bolt 44 and a star nut 46 is threaded thereon. Chain lock plate 43 is provided with a keyhole-shaped opening 47 through which chain 48 can pass and be locked at any desired link thereof. A hook 49 is secured to the end of chain 48, and is designed to hook onto the lower edge of a vehicle bumper.

Although only the central and left-hand portion of the hitch 10 (as viewed in FIG. 1) have been illustrated and described, it will be understood that all of the elements on the left-hand portion are duplicated on the right-hand portion of the hitch.

FIG. 2 illustrates the attachment of the trailer hitch 10 to a narrow and vertical vehicle bumper 60. The top hook 18 is hooked to the top edge 61 of the bumper, and the appropriate link of chain 17 is locked to the chain lock bracket 15 so that the bar 11 is at a level approximatey halfway down the bumper. The pad 28 is adjusted so that lug 32 is in notch 27, thereby placing the pad ridges 29 in essentially a vertical plane so that both pad ridges will engage the bumper and the ball bracket 12 will be essentially horizontal. The lower hook 49 is hooked into the bottom edge 62 of the bumper, the appropriate link of chain 48 is locked to plate 43 and the star nut 46 rotated to tighten chain 48. The bolt 44 and plate 43 automatically align themselves with chain 48 because the saddle 39 is free to rotate on seat 37. Because of this, there is no bending force applied to the chain-tightening system and there is no tendency for the chain to be accidentally released from the keyhole opening in plate 43. The other end of the hitch (not illustrated) is similarly attached so that the bar 11 is disposed horizontally and parallel to the bumper.

FIG. 3 illustrates the trailer hitch 10 as attached to a wide bumper 70 having a sharply contoured upper portion 71 and a relatively vertical central and lower portion 72. The upper hook 18 is again hooked to the upper edge 73 of the bumper. Since the pad 28 is again to engage a vertical bumper surface, the pad shoe lug 32 is left in pad bracket notch 27, so that the ball bracket 12 will be horizontal. The lower hook 49 is hooked onto the bottom edge 74 of the bumper, chain 48 is adjusted to a desired length and is tightened by rotation of the star nut 46. Again, the bolt 44 and plate 43 will automatically align themselves with chain 48 since the saddle 39 will rotate in seat 37 to allow this.

FIG. 4 illustrates the trailer hitch as applied to a wide bumper 80 having a flat central portion 81 that slopes downwardly and forwardly of the vehicle. The installation of the trailer hitch is the same as previously described, except that in this instance the pad 28 is pulled forwardly of the pad bracket, tilted upwardly and then pushed back into the pad bracket so that pad shoe lug 32 enters notch 26 to lock the pad in its upwardly tilted position. In this position, both pad ridges 29 will engage the bumper and the ball bracket 12 will be maintained in substantially horizontal position.

FIG. 5 illustrates a modification of the trailer hitch, the modification being identified generally by the reference numeral 110. In this modification the elongated bar 111, ball bracket 112, pad support bracket 122 and chain-tightening arm 136 are all cast as one piece. Otherwise, all of the element are the same as previously described and operate in the same manner.

It is to be realized that the embodiments of the invention herein shown and described are to be taken as preferred embodiments of the same and that various changes may be made in the shape, size and arrangement of parts without departing from the spirit of the invention or the scope of the attached claims.

Having thus described my invention, I claim:
1. A trailer hitch for connection to a vehicle bumper and comprising:
 (a) an elongated bar adapted to be disposed horizontally and parallel to said bumper;
 (b) a first hook adapted to engage the top edge of said bumper;
 (c) a first chain connected at one end thereof to said first hook and connected at its other end to said bar;
 (d) a bumper pad adapted to engage a generally vertical surface of said bumper;
 (e) means for connecting said bumper pad to said bar and for enabling said bumper pad to pivot relative to said bar about an axis parallel to said bar;
 (f) means for locking said bumper pad against pivotal movement relative to said bar when said bumper pad has been pivoted to a desired position;
 (g) a second hook adapted to engage the lower edge of said bumper;
 (h) a second chain connected at one end thereof to said second hook;
 (i) a chain tightener bracket secured to said bar and having a seat thereon provided with an aperture therethrough;
 (j) a saddle member seated on said seat for rotative movement about an axis parallel to said bar;
 (k) a threaded bolt extending through said aperture and saddle member;
 (l) means connecting one end of said bolt to said other end of said second chain;
 (m) a nut threaded on the other end of said bolt.

2. A trailer hitch as set forth in claim 1, wherein said element (l) comprises a plate secured to said one end of said bolt, said plate having a keyhole-shaped aperture therethrough to connect a desired link in said chain to said plate, and wherein said saddle member straddles said seat and has integral legs provided with grooves therein parallel to said bolt in which opposite edges of said plate are slidably received.

3. A trailer hitch as set forth in claim 1, wherein element (e) of claim 1 comprises:
 (n) a bumper pad bracket secured to said bar and extending towards said bumper pad, said bumped pad bracket having vertically bifurcated arms at the end thereof;
 (o) a shoe secured to said bumper pad and having a vertical flange disposed between said bifurcated arms and provided with an aperture therethrough;
 (p) a horizontal bolt extending through said bifurcated arms and aperture of said shoe;
and wherein said element (f) of claim 1 comprises:
 (q) a plurality of horizontal notches in the ends of said bifurcated arms;
 (r) said aperture on said shoe being elongated to permit limited movement of said bumper pad towards and away from said bumper pad bracket;
 (s) a lug on said shoe movable into and out of a desired one of said notches when said bumper pad is moved towards and away from said bumper pad bracket respectively.

References Cited
UNITED STATES PATENTS
2,668,064   2/1954   Bolling ------------ 280—502

BENJAMIN HERSH, *Primary Examiner.*

R. R. SONG, *Assistant Examiner.*